(12) United States Patent
Macias et al.

(10) Patent No.: US 8,750,875 B2
(45) Date of Patent: Jun. 10, 2014

(54) DYNAMIC HANDOFF PARAMETERS IN A WIRELESS NETWORK

(75) Inventors: John F. Macias, Antelope, CA (US); David Chiang, Fremont, CA (US); Lalit R. Kotecha, San Ramon, CA (US); Patricia Ruey-Jane Chang, San Ramon, CA (US); Jay J. Lee, San Ramon, CA (US); Thomas W. Haynes, San Ramon, CA (US)

(73) Assignees: Cellco Partnership, Basking Ridge, NJ (US); Verizon Patent and Licensing Inc., Basking Ridge, NJ (US)

( * ) Notice: Subject to any disclaimer, the term of this patent is extended or adjusted under 35 U.S.C. 154(b) by 222 days.

(21) Appl. No.: 13/227,627

(22) Filed: Sep. 8, 2011

(65) Prior Publication Data

US 2013/0065632 A1 Mar. 14, 2013

(51) Int. Cl.
*H04W 36/00* (2009.01)

(52) U.S. Cl.
USPC ........ 455/436; 455/500; 455/124.1; 455/102; 455/442; 455/456.1; 455/552.1; 455/550.1

(58) Field of Classification Search
USPC ........ 455/436, 500, 442, 550.1, 456.1, 127.1, 455/102, 552.1, 556.1; 370/401, 338, 230, 370/395.21
See application file for complete search history.

(56) References Cited

U.S. PATENT DOCUMENTS

| | | | |
|---|---|---|---|
| 6,055,428 A * | 4/2000 | Soliman | 455/437 |
| 8,194,540 B2 * | 6/2012 | Kim et al. | 370/230 |
| 2006/0217074 A1 * | 9/2006 | Wakabayashi | 455/68 |
| 2006/0245408 A1 * | 11/2006 | Lee et al. | 370/338 |
| 2007/0147320 A1 * | 6/2007 | Sattari et al. | 370/338 |
| 2009/0253456 A1 * | 10/2009 | Toh et al. | 455/550.1 |
| 2013/0040659 A1 * | 2/2013 | Van Der Velde et al. | 455/456.1 |

* cited by examiner

*Primary Examiner* — Joseph Arevalo

(57) ABSTRACT

A mobile device may determine applications that are executed by the mobile device. The mobile device may further determine handoff parameters, relating to performance of a handoff operation in a cellular network. The handoff parameters may be determined based on the applications being executed by the mobile device. A handoff operation may be performed based on the determined handoff parameters.

20 Claims, 9 Drawing Sheets

DYNAMIC HANDOFF PARAMETERS IN A WIRELESS NETWORK

BACKGROUND

In an increasingly networked world, more and more traffic, such as data, voice, and video, is transmitted over public and proprietary networks. Wireless networks, in particular, are becoming increasingly popular as networks through which subscribers obtain both voice services (e.g., telephone calls) and data services (e.g., email and web surfing).

Wireless networks may be cellular networks, made up of a number of radio coverage areas (e.g., cells). In a cellular network, different radio cells may use different radio frequencies. Additionally, radio frequencies may be reused, such as by non-adjacent cells. When a mobile device moves across the border of two cells, the network may "handoff" the device to the cell that the mobile device is entering.

DETAILED DESCRIPTION OF PREFERRED EMBODIMENTS

The following detailed description refers to the accompanying drawings. The same reference numbers in different drawings may identify the same or similar elements.

Techniques described herein may relate to dynamically determining handoff parameters in a wireless network. The handoff parameters may be dynamically determined based on quality of service (QoS) requirements and/or on a per-application basis. In one implementation, the wireless network may be a long term evolution (LTE) network and the handoff parameters that are dynamically determined may include a hysteresis threshold. As an example, if an application that is being executed by a mobile device requires a high quality of service, the hysteresis threshold may be lowered for the mobile device, which may cause the mobile device to perform a cell handoff operation sooner that would occur for a "default" hysteresis threshold. In this way, the handoff may occur before the quality of service delivered from the old cell degrades to a point that adversely affects the application.

Figure 1:
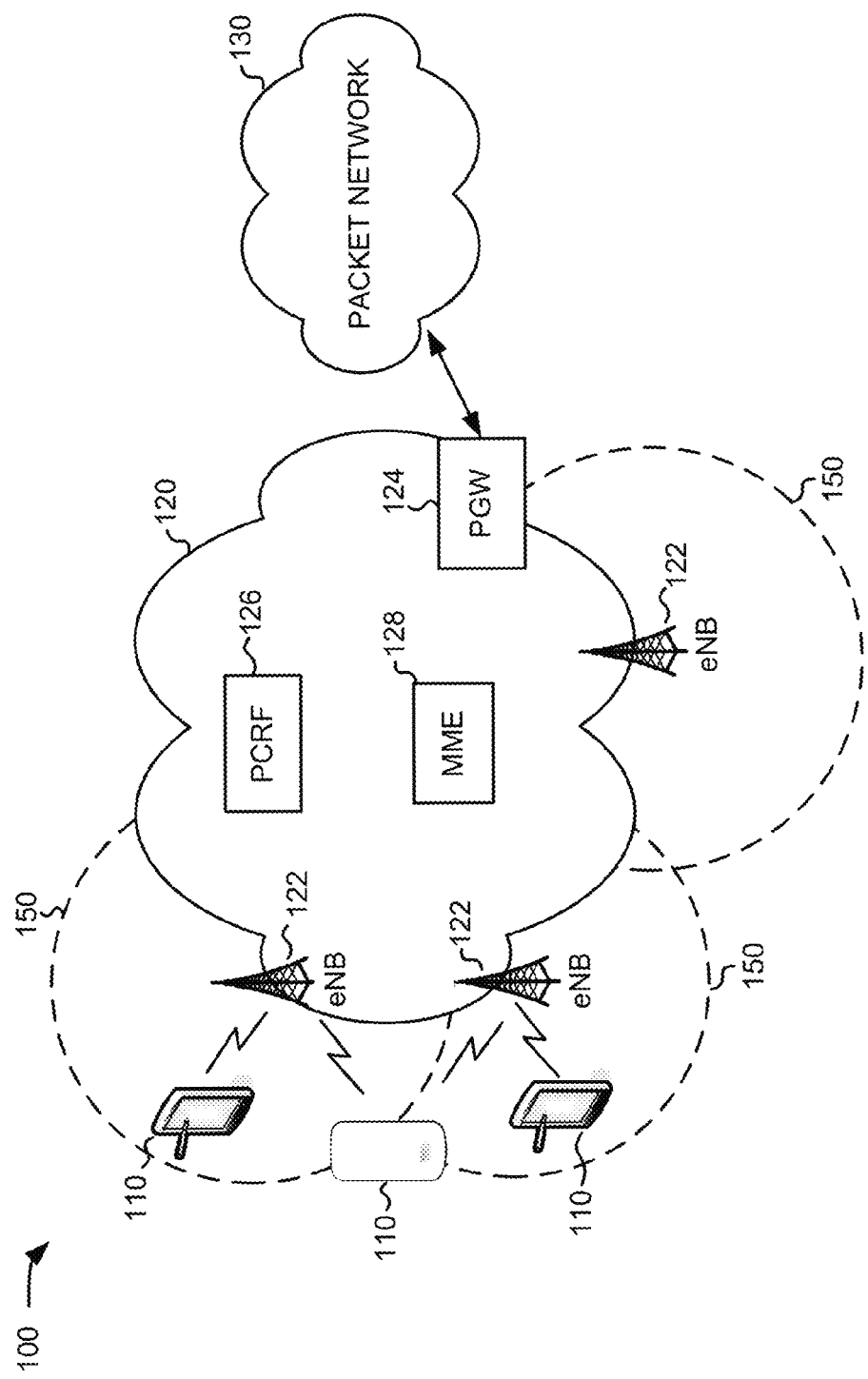
FIG. 1 is a diagram of an example environment in which systems and/or methods described herein may be implemented.

FIG. 1 is a diagram of an example environment 100 in which systems and/or methods described herein may be implemented. As illustrated, environment 100 may include mobile devices 110, access network 120, and a packet network 130. Access network 120 may be a radio access network.

Mobile devices 110 may include portable computing and communication devices, such as a personal digital assistant (PDA), a smart phone, a cellular phone, a tablet computer, a laptop with integrated connectivity to a cellular wireless network, etc. Mobile devices 110 may connect to packet network 130 through access network 120.

Access network 120 may include a network that provides connectivity to mobile devices 110. Access network 120 may represent, for example, a cellular network operated by a cellular provider. In one implementation, access network 120 may include a long term evolution (LTE) network that provides wireless services to mobile devices 110. Access network 120 may, for example, include base stations ("eNBs") 122, a packet data network gateway (PGW) 124, a policy charging and rules function (PCRF) server 126, and a mobility management entity (MME) 128. In general, a number of other networks devices, which are not shown herein for clarity, may also be used in the implementation of wireless network 120.

Base stations 122 may provide the radio interface to transmit and receive data with mobile devices 110. In one implementation, base stations 122 may utilize LTE standards operating in a 700 MHz frequency band (i.e., base stations 122 may each be a base station in a LTE network).

Each base station 122 may be associated with one or more geographical service areas surrounding the base station. The service areas may be referred to as wireless "cells" or "sectors" that are defined by the radio range of a base station 122. A single cell, corresponding to each of base stations 122, is shown as cell 150 in FIG. 1. In an alternative possible implementation, one base station 122 may be associated with multiple cells.

PGW 124 may provide connectivity to external networks, such as packet network 130. A mobile device 110 may have simultaneous connections with more than one PGW 124 to multiple additional networks. PGW 124 may perform, for example, policy enforcement, packet filtering for each user, charging support, lawful interception, and/or packet screening.

PCRF server 126 may access subscriber databases and other resources to make policy decisions relating to subscribers (i.e., users of mobile devices 110). The policy decisions may relate to, for example, quality of service (QoS) decisions and charging rules.

MME 128 may act as a control node for access network 120. MME 128 may, for example, perform idle mode tracking and perform paging functions. MME 128 may also be involved in the bearer activation/deactivation process for mobile devices 110 and may choose a PGW 124 for a mobile device 110 at the initial attach of mobile device 110 and for a handoff operation relating to mobile device 110.

Packet network 130 may include a public or private (or both) packet-based network. One or more servers may be connected to or located within packet network 130. The servers may provide, for example, delivery of content or may provide other services to mobile devices 110.

Although FIG. 1 shows example components of environment 100, in other implementations, environment 100 may contain fewer components, different components, differently arranged components, and/or additional components than those depicted in FIG. 1. Alternatively, or additionally, one or more components of environment 100 may perform one or more tasks described as being performed by one or more other components of environment 100.

Figure 2:
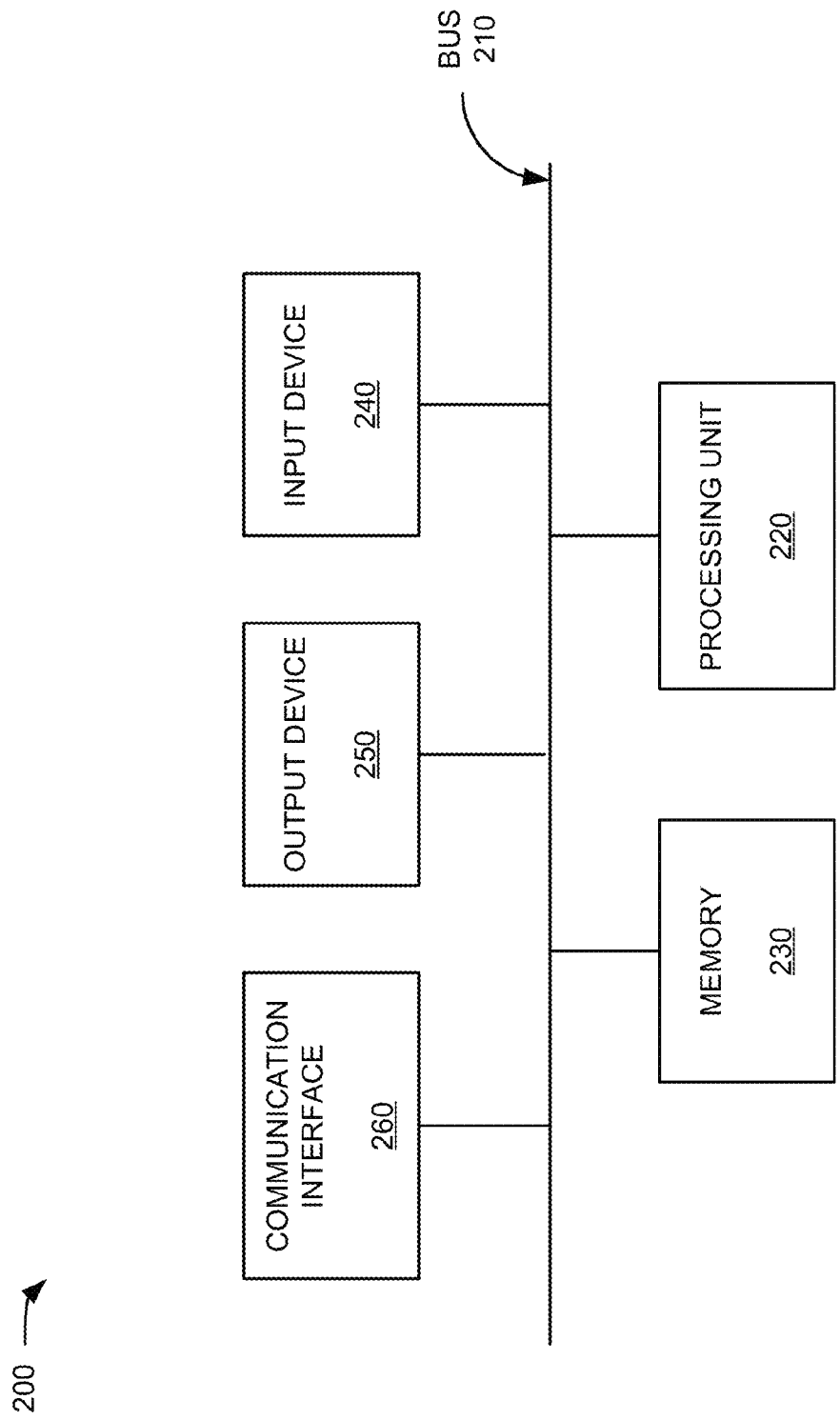
FIG. 2 is a diagram of example components of a device that may correspond to one of the components shown in the environment of FIG. 1.

FIG. 2 is a diagram of example components of a device 200 that may correspond to one of the components shown in environment 100, such as mobile device 110, base station 122, PGW 124, PCRF server 126, and/or MME 128. As illustrated, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. Additionally or alternatively, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include any transceiver-like mechanism that enables device 200 to communicate with other devices and/or systems. For example, communication interface 260 may include mechanisms for communicating with other devices. In one implementation, in which communication interface 260 is included as part of a mobile device 110, communication interface 260 may include logic for communicating with access network 120. Communication interface 260 may additionally include logic to measure the strength of the connection to access network 120. For example, communication interface 260 may measure a received signal strength of the radio signals received from various base stations 122.

As described herein, device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may contain fewer components, different components, differently arranged components, or additional components than depicted in FIG. 2. Alternatively, or additionally, one or more components of device 200 may perform one or more tasks described as being performed by one or more other components of device 200.

Figure 3:
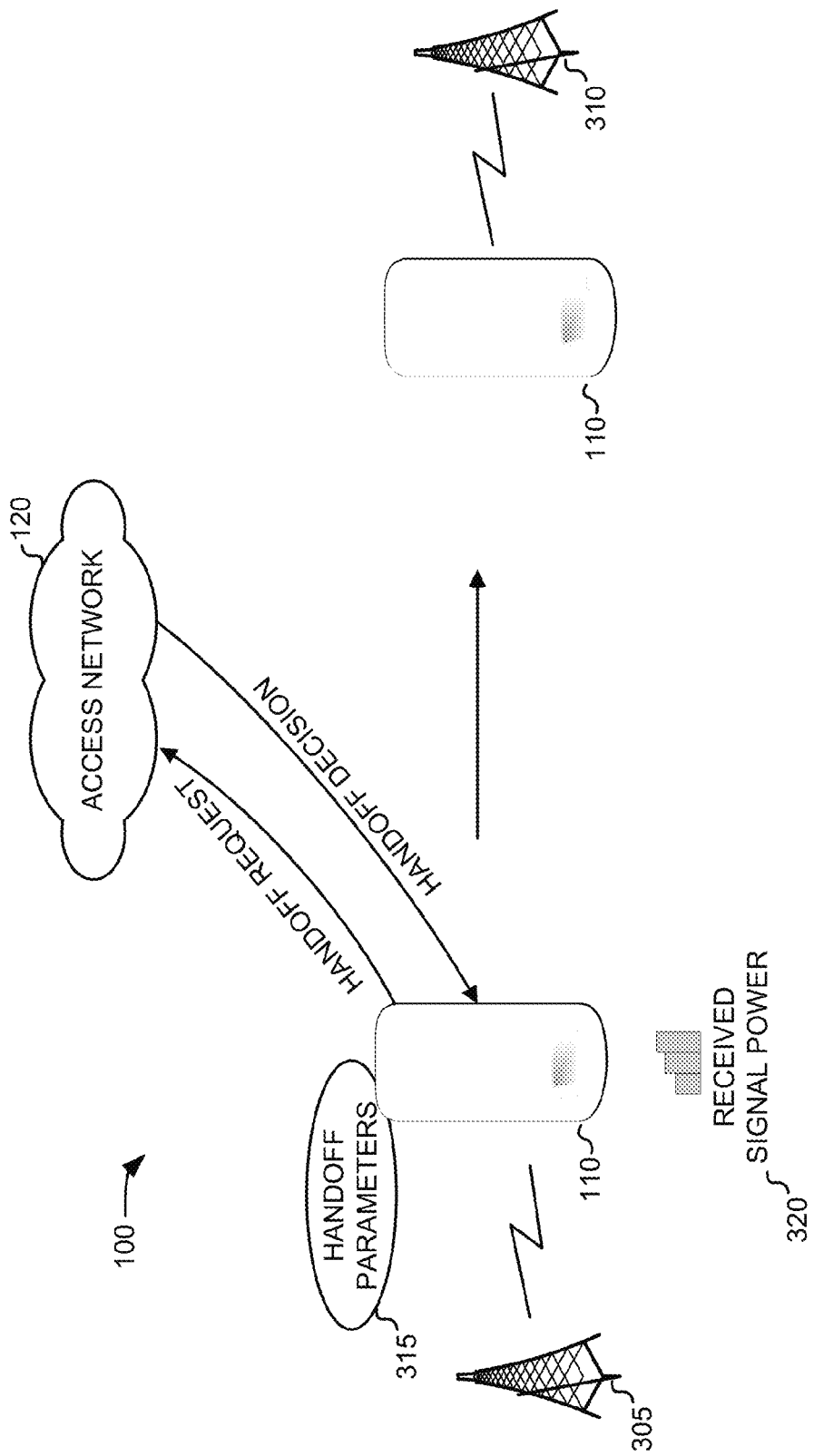
FIG. 3 is a diagram conceptually illustrating a handoff procedure for a mobile device.

FIG. 3 is a diagram conceptually illustrating a handoff procedure for a mobile device. As shown, assume that a mobile device 110 is part of a radio cell formed by a first base station 305 and that the mobile device 110 will move into a second radio cell formed by a second base station 310. Mobile device 110 may be associated with handoff parameters 315 and received signal power 320.

Handoff parameters 315 may include one or more parameters that relate to when or how a handoff operation will be performed between cells. Handoff parameters 315 may be stored in mobile device 110 at manufacture of mobile device 110, during provisioning of mobile device 110, and/or dynamically downloaded from access network 120. Consistent with aspects described herein, handoff parameters 315 may be dynamically determined based on, for example, the application or applications being used by mobile device 110.

Handoff parameters 315 may include a number of possible values. Handoff parameters 315 may include, for example, a hysteresis threshold value to use when deciding to switch between cells. Other possible parameters that may be included in handoff parameters 315 include: filter coefficients used in measuring values, such as received signal power, values relating to the timing of a handoff, etc. In general, handoff parameters 315 may represent a set of one or more parameters that are relevant to the decision of whether to perform a handoff operation or relevant to the performance of the handoff operation.

Received signal power 320 may be measured by mobile device 110, such as by communication interface 260, as a measure of the strength of the radio signals from a base station. In one implementation, received signal power 320 may include LTE reference signal received power (RSRP). Received signal power 320 may be used in conjunction with handoff parameters 315 to determine when to perform a handoff operation. In some implementations, other values that are measured or otherwise obtained by mobile device 110 may alternatively or additionally be used by mobile device 110 to determine when to perform a handoff operation.

As shown in FIG. 3, mobile device 110 may be initially connected to base station 305. As mobile device 110 moves, received signal power 320, corresponding to base station 305, may decrease, while a received signal power 320, corresponding to base station 310, may increase. At some point, based on handoff parameters 315 and received signal power 320, mobile device 110 may determine that a handoff to base station 310 is appropriate. Mobile device 110 may signal access network 120, such as by signaling base station 122, to request a handoff ("HANDOFF REQUEST"). Base station 122 may grant the handoff request ("HANDOFF DECISION"). At this point, mobile device 110 may switch to base station 310 (i.e., perform the handoff operation). In some implementations, instead of mobile device 110 requesting a handoff, mobile device 110 may transmit information, such as the received signal power 320, to base station 122, and base station 122 may make the decision of when to begin a handoff.

Figure 4:
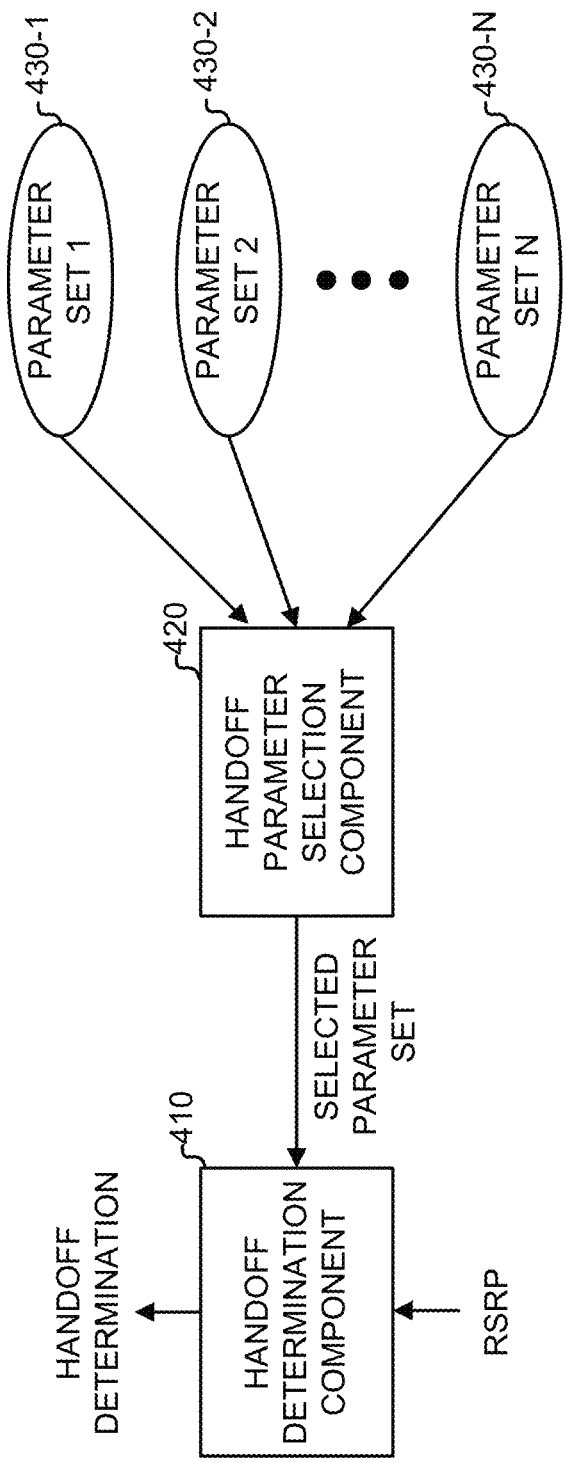
FIG. 4 is a conceptual diagram illustrating example functional components of a mobile device relating to the performance of a cell handoff.

FIG. 4 is a conceptual diagram illustrating example functional components of mobile device 110 relating to the performance of a cell handoff. The functional components may be implemented, for example, by processing unit 220 executing instructions from memory 230. As illustrated, mobile device 110 may include a handoff determination component 410, a handoff parameter selection component 420, and a number of parameter sets 430-1 through 430-N (referred to collectively as "parameter sets 430" and, in some instances, individually as "parameter set 430").

Handoff determination component 410 may include logic to determine when to request or initiate a handoff. Handoff determination component 410 may make the handoff decision based on one of handoff parameter sets 430 (SELECTED PARAMETER SET) and based on one or more signals relating to access network 120. One such example signal, reference signal received power (RSRP), is illustrated in FIG. 4. Other signals, such as a signal relating to latency in access network 120, may additionally or alternatively be used by handoff determination component 410.

In one implementation, parameter sets 430 may each be defined by a hysteresis threshold value. The hysteresis threshold value may specify an amount by which the received signal power (e.g., the RSRP value) of a neighboring cell must be greater than the current cell before a handoff will be initiated. Hysteresis threshold values near zero may have the potential to undesirably cause rapid switching back and forth between two cells (called "ping-ponging") but may provide greater responsiveness to cell power degradation. Higher threshold values may reduce ping-ponging at the cost of lesser responsiveness to cell power degradation. In situations in which parameter sets 430 are defined by a hysteresis threshold value, handoff determination component 410 may determine to initiate a handoff by comparing the received signal power of the currently connected cell to the received signal power of neighboring cells. When the received signal power of one of the neighboring cells, minus the hysteresis threshold value, is greater than the received signal power of the current cell, handoff determination component 410 may determine to request a handoff from access network 120 (e.g., the signal HANDOFF DETERMINATION may be emitted).

Handoff parameter selection component 420 may select one of parameters sets 430 for use by handoff determination component 410. The selection by handoff parameter selection component 420 may be based on a number of factors, such as, for example, the application or applications currently being used by mobile device 110, the state or configuration of access network 120, and/or measurements relating to the effectiveness of the current parameter set. The selected one of parameter sets 430 may be dynamically determined based on the current state of mobile device 110. For example, different parameter sets 430 may be optimized for different applications. Accordingly, the currently selected parameter set 430 may be based on the applications currently being executed by mobile device 110. The operation of handoff parameter selection component 420 will be described in more detail below.

Parameter sets 430 may each include one or more parameters relevant to a handoff operation. As discussed previously, in one possible implementation, each parameter set 430 may include a hysteresis threshold value. Parameter sets 430 may be obtained during manufacture or provisioning of mobile device 110, and/or may be dynamically downloaded from access network 120. For example, each base station 122 may be associated with one or more parameter sets 430 that may be transmitted, to mobile device 110, when mobile device 110 connects to the base station (i.e., the parameter sets 430 may be stored at the base station). In some implementations, one of parameter sets 430 may be a default parameter set that may normally be selected by handoff parameter selection component 420.

Although FIG. 4 shows example functional components 400, in other implementations, FIG. 4 may contain fewer functional components, different functional components, differently arranged functional components, and/or additional functional components than those depicted in FIG. 4. Alternatively, or additionally, one or more functional components may perform one or more tasks described as being performed by one or more other functional components.

Figures 5A, 5B:
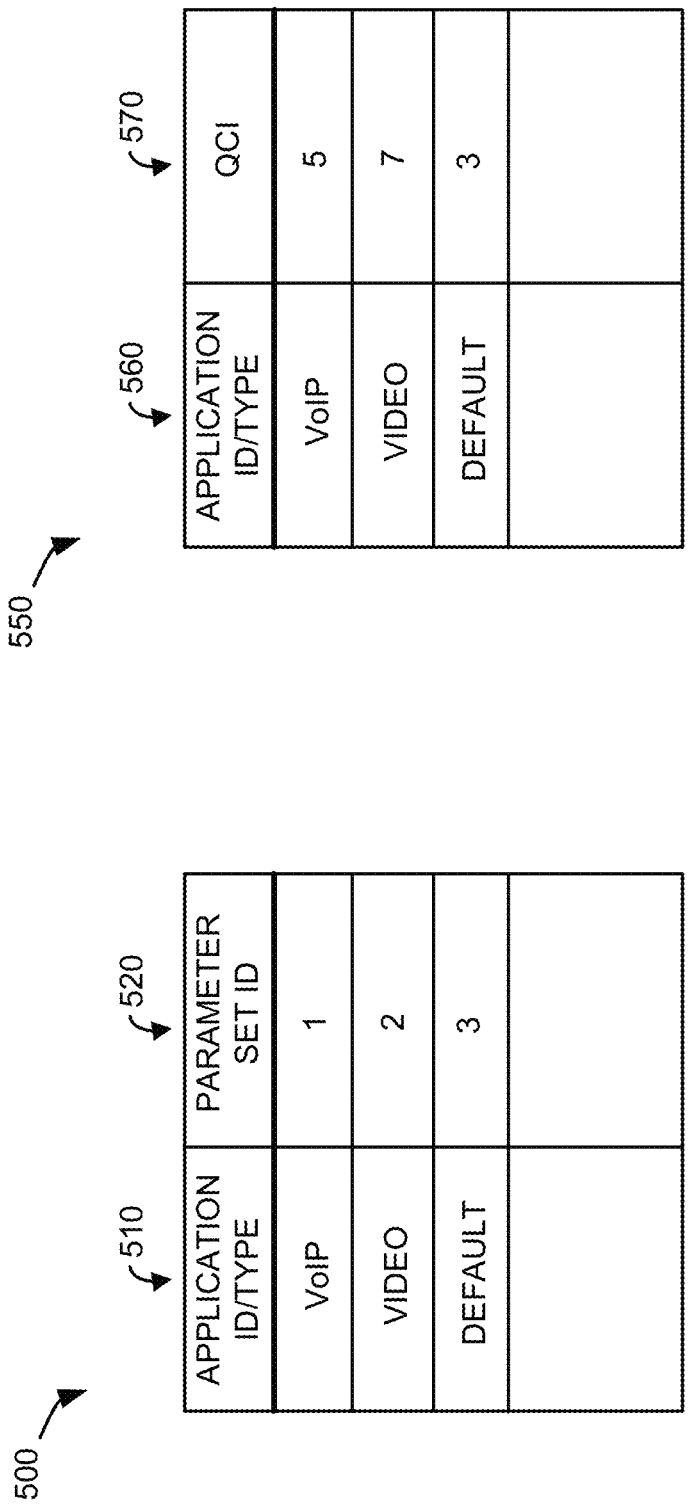
FIGS. 5A and 5B are diagrams illustrating example data structures that may be maintained by a mobile device or base station.

FIGS. 5A and 5B are diagrams illustrating example data structures 500 and 550 that may be maintained by mobile device 110 or base station 122 (or another device in access network 120, such as PCRF 126 or MME 128). In general, the data structures of FIGS. 5A and 5B may be used by handoff parameter selection component 420 in determining when to dynamically select or modify parameter sets 430.

As shown in FIG. 5A, data structure 500 may include an application identification (ID)/type field 510 and a parameter set ID field 520.

Application ID/type field 510 may identify various applications that may be installed or may be used by mobile device 110. Application ID/type field 510 may include, for example, a string or other value that may be used to identify an application. Alternatively or additionally, applications may be identified by an application type, where the "type" of an application may refer to a category in which applications may be grouped. For example, and as shown in FIG. 5A, applications that use voice over IP (VoIP) services may be included as a "VoIP" type and applications that use video services may be included as a "Video" type. A "DEFAULT" application type is also shown for data structure 500, which may refer to any application that is not otherwise included in application ID/type field 510.

Parameter set ID field 520 may identify one of parameter sets 430 to use for the corresponding application ID/type. As shown, applications that are VoIP applications may use the parameter set 430 labeled "1," applications that are "Video" applications may use the parameter set 430 labeled "2," and other applications that are not "VoIP" and "Video" applications may use the parameter set 430 labeled "3." In this manner, parameters relating to a cellular handoff may be specified on a per-application basis. The assignment of applications to parameter sets may be done, for example, by the operation of access network 120.

Data structure 550 (FIG. 5B) illustrates another example of a data structure that may be used to dynamically select or modify parameter sets 430. As shown in FIG. 5B, data structure 550 may include an application identification (ID)/type field 560 and a Quality of Service (QoS) Classification Index (QCI) field 570.

Application ID/type field 550 may be similar to application ID/type field 510 and may identify various applications that may be installed or used by mobile device 110. Application ID/type field 550 may include, for example, a string or other value that may be used to identify an application and/or identify an application type.

QCI field 570 may include a QCI value for the corresponding application ID/type. A QCI value may be an index, such as an integer, that represents a particular QoS level. The QoS of a connection may be specified using a number of parameters, such as the bandwidth and latency for the connection. The QCI value may represent the QoS parameters as a single index value, called a QoS index herein. The QoS index, as stored in QCI field 570, may be a single value that characterizes the QoS needed or desired by the application or application type.

In data structure 550, the QCI values, in QCI field 570, may be implemented so that higher QCI values correspond to a higher QoS level. In the example shown, applications that use video services (VIDEO) may require a high QoS level (e.g., high bandwidth and low latency) and may be assigned a relatively high QCI value (e.g., 7). VoIP applications, however, may not require as high of a QoS level of service and, as shown, may be assigned a lower QCI value (e.g., 5). Other application types may be assigned a lower, default QCI value (e.g., 3).

Although FIGS. 5A and 5B show example fields in data structure 500 and 550, in other implementations, data structures 500 and 550 may be structured differently or contain fewer fields, different fields, or additional fields.

Figure 6:
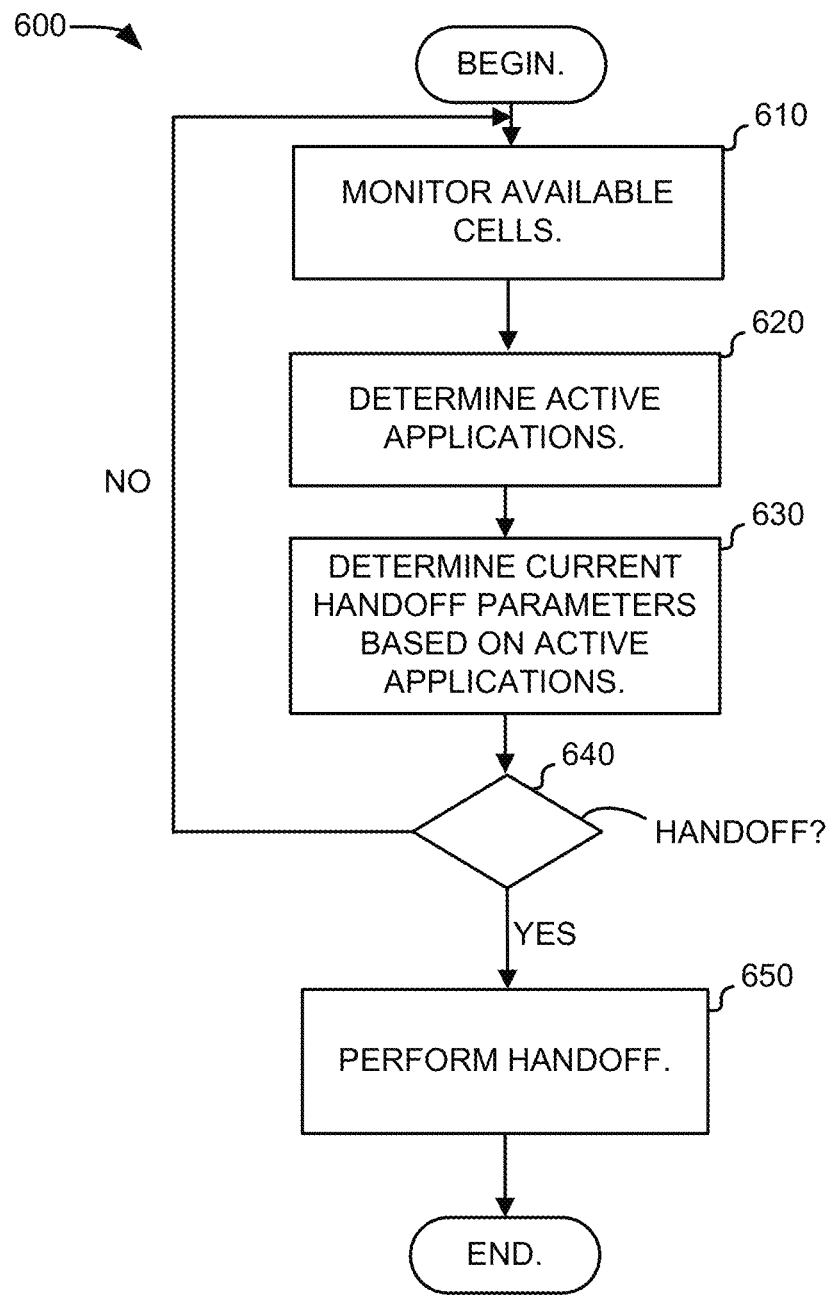
FIG. 6 is a flow chart illustrating an example process for performing a handoff operation.

FIG. 6 is a flow chart illustrating an example process 600 for performing a handoff operation. Process 600 may be performed, for example, by one of mobile devices 110, alone or possibly in combination with one or more devices in access network 120, such as base station 122 or MME 128.

Process 600 may include monitoring the cells in access network 120 that are currently available to the mobile device (block 610). Mobile device 110 may, for instance, measure the received signal power strength from each cell, in access network 120, that is within radio range of mobile device 110.

Process 600 may further include determining the active applications that are being executed by the mobile device (block 620). An application, such as an application executed by mobile device 110, may implement a number of services that require a network connection. For example, a VoIP application, a multiplayer online game, a video conferencing application, a web browser, or any other application that accesses a remote resource may need a network connection through access network 120. Mobile device 110, such as at an operating system level of mobile device 110, may be able to monitor the active applications of mobile device 110.

Process 600 may further include determining the current handoff parameters, such as a current handoff parameter set 430, based on the determined active applications (block 630). In one implementation of block 630, handoff parameter selection component 420 may lookup the current handoff parameters, from data structure 500, based on the active applications. If there are multiple active applications, the handoff parameter set may be chosen as, for example, the one of the looked-up parameter sets that satisfies a predetermined rule (e.g., the highest numbered parameter set, the parameter set corresponding to a highest QoS value, etc).

In another possible implementation of block 630, the current handoff parameters may be determined based on the active applications and based on the QCI values in data structure 550. For instance, handoff parameter selection component 420 may lookup the QCI value, corresponding to QCI field 570, for the applications being executed by mobile device 110. The highest of the looked-up QCI values may then be used to select or set one of parameter sets 430. In one implementation, when the selected parameter set includes a hysteresis threshold parameter, the highest of the looked-up QCI values may determine, such as by using a predetermined formula, the hysteresis threshold value. In this case, higher QCI values may correspond to lower hysteresis threshold values and lower QCI values may correspond to higher hysteresis values. In this manner, if an application that is being executed by mobile device 110 requires a high QCI value, the hysteresis threshold may be lowered for mobile device 110, which may cause mobile device 110 to initiate a handoff operation sooner than may occur for a lower QCI value. In general, applications that are designed to operate in a highly mobile environment, such as a VoIP application, may be associated with a high QCI value, and may hence be associated with a relatively low hysteresis threshold value.

Figure 7B:
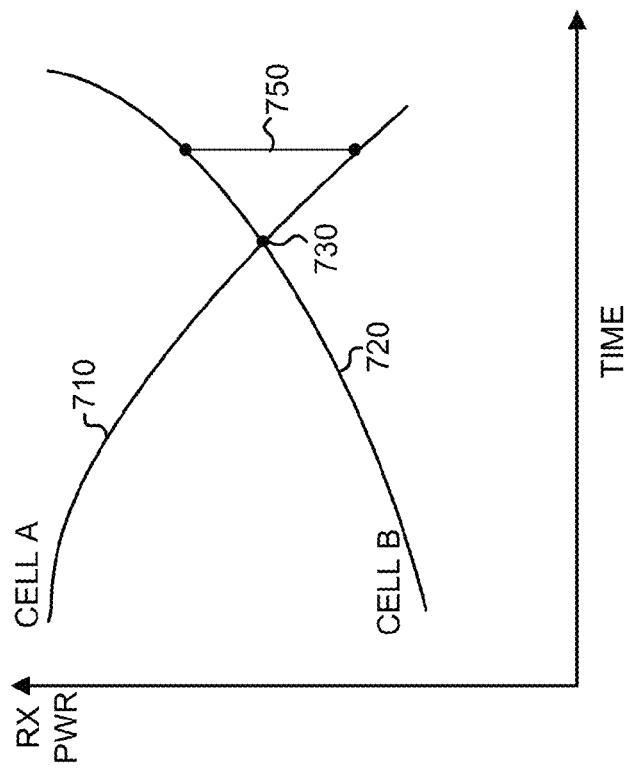
FIGS. 7A and 7B are diagrams illustrating an example of a modification of a hysteresis threshold value.
Figure 7A:
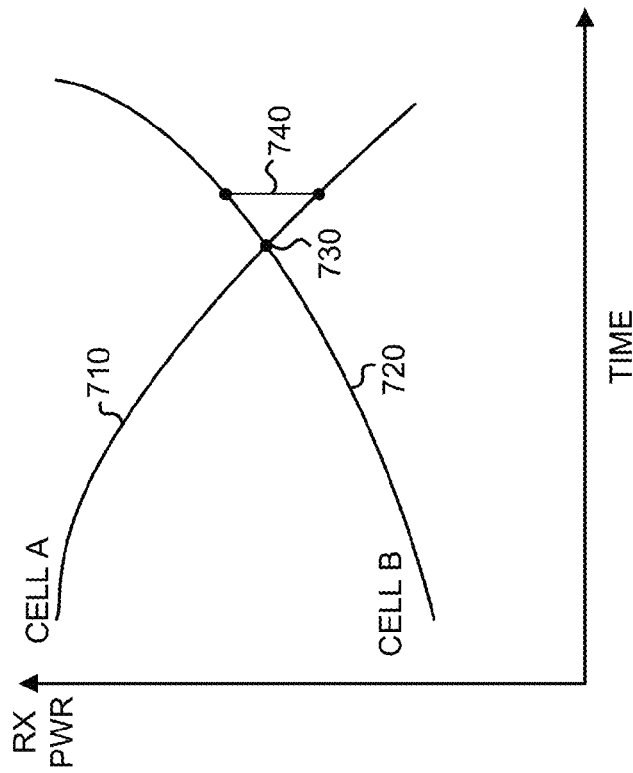

FIGS. 7A and 7B are diagrams illustrating an example of the modification of the hysteresis threshold value, as may be performed in block 630. In FIGS. 7A and 7B, received signal power (RX PWR) is shown on the vertical axis and time (TIME) is shown on the horizontal axis. Assume that the received signal power for the current cell (CELL A) is shown as curve 710 and the received signal power for another cell (CELL B) is shown as curve 720. Also, as shown, the received signal power for cells A and B are equal at point 730.

In FIG. 7A, the hysteresis threshold value may be indicated by line segment 740. At this point, the received signal power of cell B is greater than cell A by the hysteresis threshold value. Accordingly, a handover operation may be initiated at this point. In FIG. 7B, the hysteresis threshold value may be indicated by line segment 750. The hysteresis threshold value in FIG. 7B is larger than that shown in FIG. 7A, indicating that the handoff operation may be initiated at a later point in time. In the context of block 630, if the current applications indicate a high QCI value, handoff parameter selection component 420 may lower the hysteresis threshold value to that shown in FIG. 7A, which may lead to a more responsive handoff operation. If, however, the current applications indicate a lower QCI value, handoff parameter selection component 420 may raise the hysteresis threshold value to that shown in FIG. 7B, which may lead to more stable handoff operations with less chance of ping-ponging between cells.

Referring back to FIG. 6, process 600 may further include determining whether a handoff should be initiated (block 640). As previously mentioned, the determination of whether a handoff should be initiated may be determined based on a comparison of the current handoff parameters (e.g., as determined in block 630) and based on information relating to access network 120, such as the received signal power from access network 120. The determination may be made by mobile device 110 or by devices in access network 120, such as by the base station 122 to which the mobile device is connected. In one implementation, in which the determined handoff parameters are defined by a hysteresis threshold value, a handoff determination may be made when the received power of a cell, to which mobile device 110 is not connected, is greater, by the hysteresis threshold value, than the received power of the cell to which mobile device 110 is connected.

Process 600 may further include performing, when a handoff is to be initiated (block 640—YES), the handoff operation (block 650). In the handoff operation, mobile device 110 may begin to communicate with the base station 122 associated with the new cell. As one example, of a handoff operation, mobile device 110 may send a handoff request to base station 122 and may receive confirmation of the request from base station 122. In another possible implementation, base station 122 may initiate the handoff operation, possibly in response to information received from mobile device 110. In either situation, one or more devices in access network 120 may also communicate with the new base station 122 to which the mobile device is to be transferred.

The implementations discussed above dynamically adjusted or set handoff parameters based on applications being executed by a mobile device. In alternate implementations, other factors may instead or additionally be used to adjust or set handoff parameters.

Figure 8:
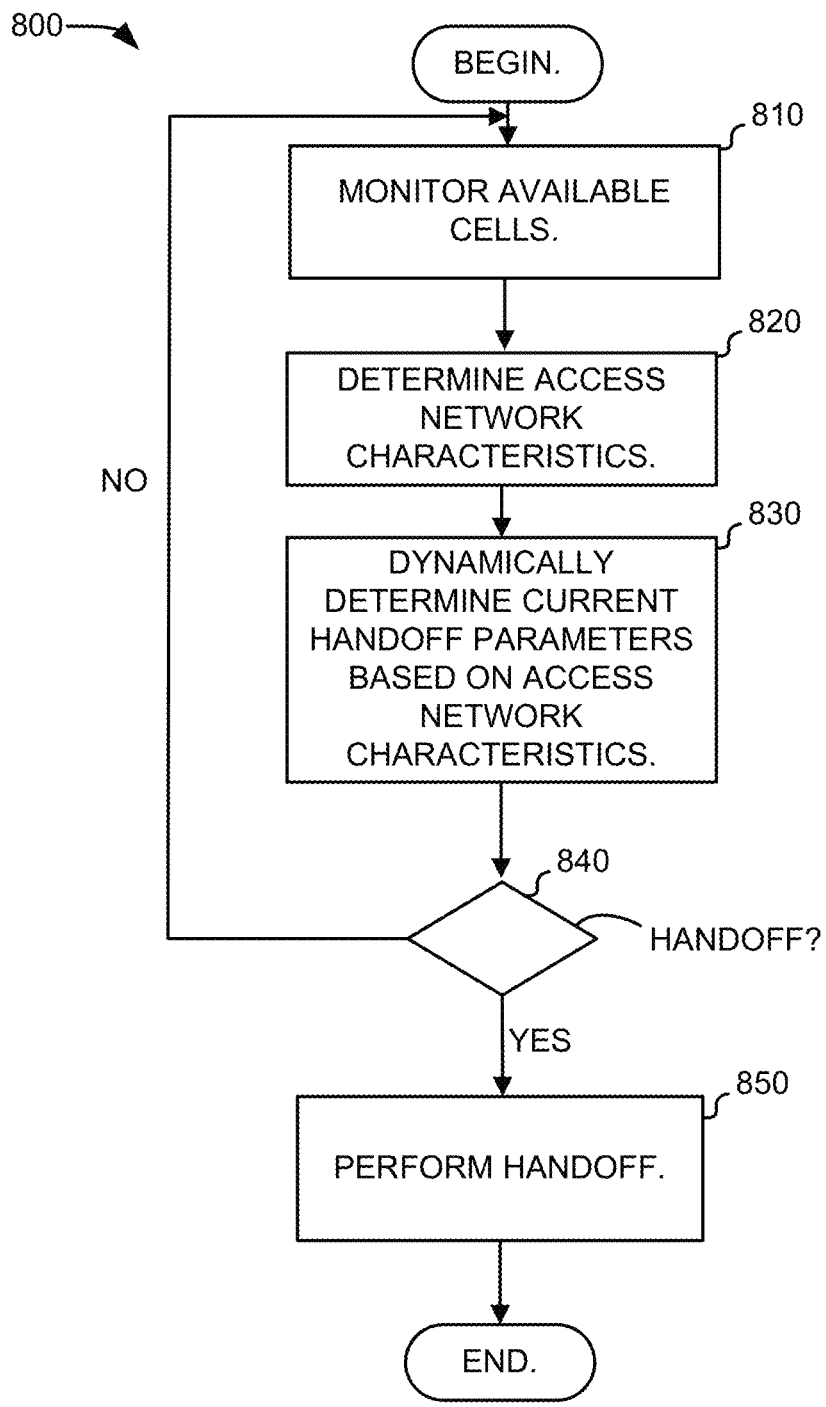
FIG. 8 is a flow chart illustrating an example process for dynamically determining handoff parameters based on factors relating to an access network.

FIG. 8 is a flow chart illustrating an example process 800 for dynamically determining handoff parameters based on factors relating to access network 120. Process 800 may be performed, for example, by one of mobile devices 110 and/or in combination with a device in access network 120, such as base station 122 or MME 128.

Process 800 may include monitoring the cells in access network 120 that are currently available to the mobile device (block 810). Mobile device 110 may, for instance, measure the received signal power strength from each cell, in access network 120, that is within radio range of mobile device 110.

Process 800 may further include determining characteristics relating to access network 120 (block 820). The characteristics relating to access network 120 may include, in addition to the previously discussed received signal power, additional information, such as: a historical measure of the amount of ping-ponging between cells that occurs for various ones of the handoff parameter sets 430, whether a neighboring cell is associated with different network devices (e.g., whether the neighboring cell is associated with a different MME), and/or other information. The determined characteristics may be obtained by mobile device 110 (e.g., the ping-ponging information), by access network 120 (e.g., the MME information), or by access network in combination with mobile device 110 (e.g., access network 128 may transmit MME information to mobile device 110).

Process 800 may further include dynamically determining the current handoff parameters, such as a current handoff parameter set 430, based on the determined access network characteristics (block 830). In one implementation of block 830, the historical measure of ping-ponging may be used to adjust the handoff parameters. For example, if the current handoff parameters include a value for the hysteresis threshold that causes excessive ping-ponging (i.e., excessive switching back and forth between the cells), the hysteresis threshold value may be adjusted higher to reduce the amount of ping-ponging. The level at which ping-ponging may be determined to be excessive may be based on, for example, a predetermined value, such as a value set during manufacture of mobile device 110 or received from access network 120. Alternatively, the value may be configurable, such as by a network administrator.

As a second example of an implementation of block 830, consider the situation in which a neighboring cell is associated with a different MME 128. As previously mentioned, MME 128 may act as a control node, for access network 120, which may be involved in the control of handoff operations. For a handoff that results in a change in physical MMEs 128, different handoff parameters may be desirable. For example, a handoff between MMEs 128 may require a longer time to complete than a handoff in which the same MME 128 is associated with the beginning and ending cell. Accordingly, in this situation, a parameter in parameter set 430, relating to the maximum allowed time for the handoff, may be increased. As a further example, a handoff between MMEs 128 that are manufactured by different vendors may require even more time to complete, and in this case, the parameter in parameter set 430, relating to the maximum allowed time for the handoff, may be even further increased.

Figure 9:
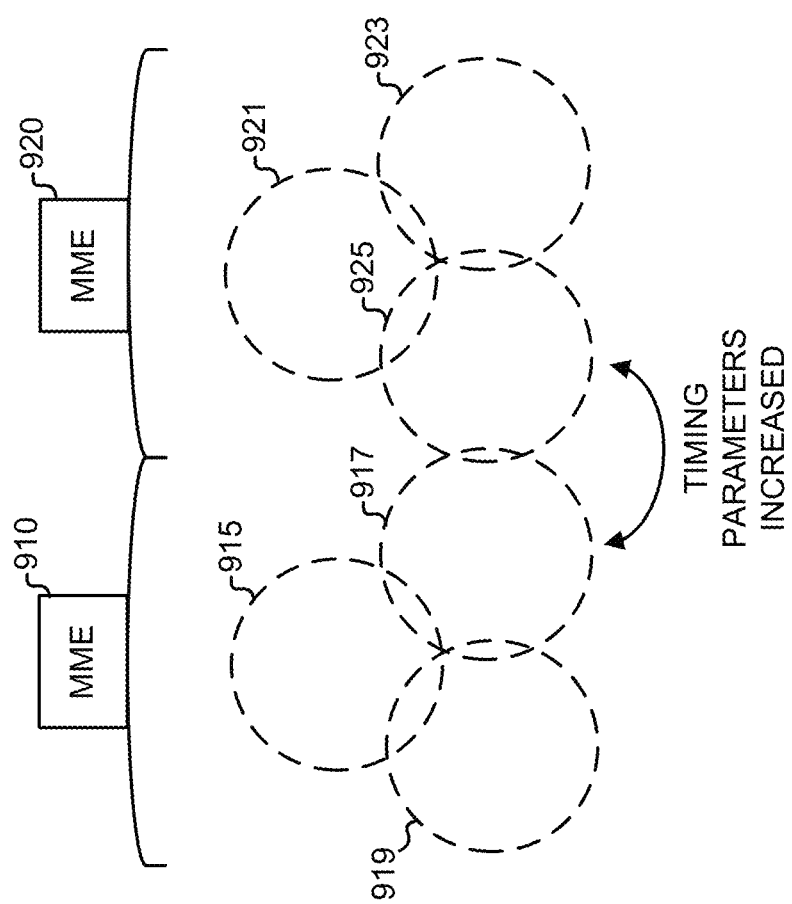
FIG. 9 is a diagram illustrating an example handoff operation between cells associated with different mobility management entities (MMEs).

FIG. 9 is a diagram illustrating an example handoff operation between cells associated with different MMEs. As shown, assume that two MMEs, MME 910 and MME 920, are included in access network 120. MMEs 910 and 920 may control handoff operations for mobile devices. For example, MME 910 may be responsible for mobile devices in cells 915, 917, and 919. Similarly, MME 920 may be responsible for mobile devices in cells 921, 923, and 925. Assume that a mobile device attached to cell 917 is to be handed off to cell 925. Because cells 917 and 925 are associated with different MMEs, handoff parameters relating to the timing of the handoff, such as a maximum allowed time for completion of the handoff, may be increased.

Referring back to FIG. 8, process 800 may further include determining whether a handoff should be initiated (block 840). As previously mentioned, the determination of whether a handoff should be initiated may be determined based on a comparison of the current handoff parameters (e.g., as determined in block 830) and based on information relating to access network 120, such as the received signal power from access network 120. The determination may be made by mobile device 110 or by devices in access network 120, such as by the base station 122 to which the mobile device is connected.

Process 800 may further include performing, when a handoff is to be initiated (block 840-YES), the handoff operation (block 850). In the handoff operation, mobile device 110 may begin to communicate with the base station 122 associated with the new cell. As one example, of a handoff operation, mobile device 110 may send a handoff request to base station 122 and may receive confirmation of the request from base station 122. In another possible implementation, base station 122 may initiate the handoff operation, possibly in response to information received from mobile device 110. In either situation, one or more devices in access network 120 may also communicate with the new base station 122 to which the mobile device is to be transferred.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 6 and 8, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

The term "component," as used herein, is intended to be broadly construed to include hardware (e.g., a processor, a microprocessor, an ASIC, a FPGA, a chip, a memory device (e.g., a ROM, a RAM, etc.), etc.) or a combination of hardware and software (e.g., a processor, microprocessor, ASIC, etc. executing software contained in a memory device).

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method implemented by a mobile device, the method comprising:

determining, by the mobile device, one or more applications being executed by the mobile device;

determining, by the mobile device and from a plurality of sets of handoff parameters stored at the mobile device, a set of handoff parameters, relating to performance of a handoff operation in a cellular network, where the set of handoff parameters is determined based on the one or more applications being executed by the mobile device and a Quality of Service (QoS) Classification Index (QCI) associated with the one or more applications, wherein the one or more handoff parameters include a hysteresis threshold value, and wherein the hysteresis threshold value specifies an amount by which a received signal power of a neighboring cell in the cellular network must be greater than a received signal power of a cell to which the mobile device is connected before a handoff operation is initiated; and initiating, by the mobile device, the handoff operation based on the one or more handoff parameters.

2. The method of claim 1, where the set of handoff parameters is received from a device in the cellular network.

3. The method of claim 1, further including:
adjusting the hysteresis threshold value based on quality of service (QoS) requirements of the one or more applications being executed by the mobile device.

4. The method of claim 3, where the hysteresis threshold value is adjusted to be lower for applications requiring a high QoS and higher for applications requiring a lower QoS.

5. The method of claim 1, where the one or more applications being executed by the mobile device include a plurality of applications, and where the method further includes:
selecting one of the plurality of applications to use in determining the set of handoff parameters, the selected one of the plurality of applications being associated with a highest quality of service (QoS) requirement.

6. The method of claim 1, where initiating the handoff operation includes:
transmitting an indication of received signal power to the cellular network; or
transmitting a handoff request to the cellular network.

7. The method of claim 1, where determining the one or more handoff parameters includes:
determining the set of handoff parameters as a set of handoff parameters, selected from the plurality of sets of handoff parameters, based on a current state of the cellular network.

8. A device comprising:
a communication interface to connect to a cellular network;
a processor; and
a memory to store programming instructions that, when executed by the processor, cause the processor to:
determine one or more applications being executed by the device;
identify, from a plurality of sets of handoff parameters, a set of handoff parameters, relating to performance of a handoff operation in the cellular network, where the handoff parameters are identified based on the one or more applications being executed by the device and a Quality of Service (QoS) Classification Index (QCI) associated with the one or more applications, wherein the one or more handoff parameters include a hysteresis threshold value, and wherein the hysteresis threshold value specifies an amount by which a received signal power of a neighboring cell in the cellular network must be greater than a received signal power of a cell to which the device is connected before a handoff operation is initiated; and
initiate the handoff operation, based on the one or more handoff parameters, to cause the communication interface to connect to a different cell in the cellular network.

9. The device of claim 8, where the one or more applications being executed by the device include a plurality of applications, and where the programming instructions additionally include programming instructions to cause the processor to:
select one of the plurality of applications to use in identifying the set of handoff parameters, the selected one of the plurality of applications being associated with a highest quality of service (QoS) requirement.

10. The device of claim 8, where the programming instructions to identify the one or more handoff parameters additionally include programming instructions to cause the processor to:
identify the set of handoff parameters as a set of handoff parameters, selected from the plurality of sets of handoff parameters, based on a current state of the cellular network.

11. A method implemented by a mobile device, the method comprising:
determining, by the mobile device, one or more characteristics relating to a cellular wireless access network to which the mobile device connects;
determining, by the mobile device, a set of handoff parameters, selected from a plurality of sets of possible handoff parameters, relating to performance of a handoff operation in the cellular wireless access network, where the set of handoff parameters is determined based on a Quality of Service (QoS) Classification Index (QCI) associated with one or more applications being executed by the mobile device and the one or more characteristics, and wherein each set of possible handoff parameters, of the plurality of sets of possible handoff parameters, includes a corresponding hysteresis threshold value; and
initiating, by the mobile device, a handoff operation based on the determined set of handoff parameters and the hysteresis threshold value that corresponds to the determined set of handoff parameters, wherein the hysteresis threshold value that corresponds to the determined set of handoff parameters specifies an amount by which a received signal power of a neighboring cell in the cellular wireless access network must be greater than a received signal power of a cell to which the mobile device is connected before the handoff operation is initiated.

12. The method of claim 11, where the characteristics include a historical measure of ping-ponging, by the mobile device, between cells in the cellular wireless access network.

13. The method of claim 11, where the characteristics include an indication of whether cells in the cellular wireless access network are associated with different mobility management entity (MME) devices.

14. The method of claim 11, where determining the set of handoff parameters includes adjusting one or more handoff parameters based on the characteristics.

15. The method of claim 11, where determining the set of handoff parameters further includes determining the set of handoff parameters based on the one or more applications being executed by the mobile device.

16. A mobile device comprising:
a communication interface to connect to a cellular network;
a processor; and
a memory to store programming instructions that, when executed by the processor, cause the processor to:
determine one or more characteristics relating to the cellular network to which the mobile device connects;

determine a set of handoff parameters, selected from a plurality of sets of possible handoff parameters, relating to performance of a handoff operation in the cellular network, where the set of handoff parameters is determined based on a Quality of Service (QoS) Classification Index (QCI) associated with one or more applications being executed by the mobile device and the one or more characteristics, and wherein each set of possible handoff parameters, of the plurality of sets of possible handoff parameters, includes a corresponding hysteresis threshold value; and initiate a handoff operation based on the determined set of handoff parameters and the hysteresis threshold value corresponding to the determined set of handoff parameters to cause the communication interface to connect to a different cell in the cellular network, wherein the hysteresis threshold value that corresponds to the determined set of handoff parameters specifies an amount by which a received signal power of a neighboring cell in the cellular network must be greater than a received signal power of a cell to which the mobile device is connected before the handoff operation is initiated.

17. The mobile device of claim 16, where the characteristics include a historical measure of ping-ponging, by the mobile device, between cells in the cellular network.

18. The mobile device of claim 16, where the characteristics include an indication of whether cells in the cellular network are associated with different mobility management entity (MME) devices.

19. The mobile device of claim 16, where the instructions to determine the set of handoff parameters further includes instructions to cause the processor to:

adjust one or more handoff parameters based on the characteristics.

20. The mobile device of claim 16, where the instructions to determine the set of handoff parameters further includes instructions to cause the processor to determine the set of handoff parameters based on the one or more applications being executed by the mobile device.

* * * * *